United States Patent
Zhang

(10) Patent No.: US 9,139,761 B2
(45) Date of Patent: Sep. 22, 2015

(54) AQUEOUS PARTICULATE SLURRY COMPOSITIONS AND METHODS OF MAKING SAME

(75) Inventor: Kewei Zhang, Calgary (CA)

(73) Assignee: TRICAN WELL SERVICE LTD., Calgary (CA)

( * ) Notice: Subject to any disclaimer, the term of this patent is extended or adjusted under 35 U.S.C. 154(b) by 164 days.

(21) Appl. No.: 13/305,325

(22) Filed: Nov. 28, 2011

(65) Prior Publication Data

US 2012/0071371 A1  Mar. 22, 2012

Related U.S. Application Data

(62) Division of application No. 12/595,461, filed as application No. PCT/CA2008/000669 on Apr. 11, 2008, now Pat. No. 8,105,986.

(30) Foreign Application Priority Data

Apr. 13, 2007 (CA) .................................... 2585065

(51) Int. Cl.
*C09K 8/86* (2006.01)
*C09K 8/80* (2006.01)
*B03D 1/01* (2006.01)
*B03D 1/02* (2006.01)
*C09K 8/03* (2006.01)
*C09K 8/536* (2006.01)
*C09K 8/66* (2006.01)

(52) U.S. Cl.
CPC ... *C09K 8/80* (2013.01); *B03D 1/01* (2013.01); *B03D 1/02* (2013.01); *C09K 8/032* (2013.01); *C09K 8/536* (2013.01); *C09K 8/665* (2013.01)

(58) Field of Classification Search
USPC ............ 507/239, 261, 904, 922, 924; 516/77, 516/78, 79, 203
See application file for complete search history.

(56) References Cited

U.S. PATENT DOCUMENTS

| | | | |
|---|---|---|---|
| 2,331,594 A * | 10/1943 | Blair, Jr. .................... | 507/242 |
| 2,419,755 A * | 4/1947 | Albaugh ................... | 507/242 |
| 2,885,078 A * | 5/1959 | Fenske ...................... | 209/166 |
| 3,060,210 A | 10/1962 | De Groot | |
| 3,179,250 A | 4/1965 | Bunge | |
| 3,857,444 A * | 12/1974 | Copeland .................. | 166/276 |
| 3,868,318 A | 2/1975 | Clark et al. | |
| 3,945,435 A * | 3/1976 | Barry ......................... | 166/267 |
| 4,000,781 A * | 1/1977 | Knapp ........................ | 166/276 |
| 4,042,031 A * | 8/1977 | Knapp ........................ | 166/276 |
| 4,231,428 A | 11/1980 | Needham | |
| 4,368,136 A * | 1/1983 | Murphey .................... | 507/211 |
| 4,725,351 A | 2/1988 | Mehrotra | |
| 5,643,672 A | 7/1997 | Marchi | |
| 7,066,258 B2 | 6/2006 | Justus et al. | |
| 7,066,528 B1 | 6/2006 | Crean | |
| 7,723,274 B2 | 5/2010 | Zhang | |
| 8,105,986 B2 * | 1/2012 | Zhang ......................... | 507/239 |
| 2003/0102128 A1 | 6/2003 | Dawson | |
| 2003/0146134 A1 | 8/2003 | Yoon | |
| 2003/0217953 A1 * | 11/2003 | Xu et al. ..................... | 209/163 |
| 2004/0023818 A1 | 2/2004 | Nguyen | |
| 2005/0252658 A1 | 11/2005 | Willingham et al. | |
| 2007/0015669 A1 | 1/2007 | Zhang | |
| 2010/0197526 A1 | 8/2010 | Zhang | |
| 2010/0256024 A1 * | 10/2010 | Zhang ......................... | 507/219 |
| 2010/0267593 A1 | 10/2010 | Zhang | |
| 2011/0011589 A1 | 1/2011 | Zhang et al. | |

FOREIGN PATENT DOCUMENTS

| | | |
|---|---|---|
| CA | 2545563 | 2/2011 |
| WO | 2006116868 | 11/2006 |

OTHER PUBLICATIONS

Alan S Michaels; "A Low Cost Construction Material"; Industrial and Engineering Chemistry; vol. 52, No. 9; Sep. 1960; pp. 785-788.*

* cited by examiner

*Primary Examiner* — John J Figueroa

(74) *Attorney, Agent, or Firm* — Nicholas J. Landau; Bradley Arant Boult Cummings LLP

(57) ABSTRACT

A sand slurry composition and a method for making sand slurries are disclosed. The sand slurry composition is comprised of sand, an aqueous liquid and a chemical compound that renders the surface sand of hydrophobic. The method is comprised of rendering sand surface hydrophobic during or before making the slurry. This method and composition can find many applications in different industries, especially in various oil field applications.

29 Claims, No Drawings

US 9,139,761 B2

AQUEOUS PARTICULATE SLURRY COMPOSITIONS AND METHODS OF MAKING SAME

This is a divisional application of U.S. application Ser. No. 12/595,461 filed on Oct. 9, 2009, and which issued on Jan. 31, 2012 as U.S. Pat. No. 8,105,986. U.S. application Ser. No. 12/595,461 is a U.S. National Stage under 35 U.S.C. §371 of international application number PCT/CA2008/000669, filed on Apr. 11, 2008, currently expired. International application number PCT/CA2008/000669 claims priority from Canadian Patent Application No. 2,585,065 filed Apr. 13, 2007, which is currently pending. All of the foregoing referenced documents are incorporated herein by reference in their entireties.

FIELD

This invention relates to particulate slurry compositions and methods of making same in general, and sand slurries in particular.

BACKGROUND

Sand slurries are used in a variety of industries including petroleum, pipeline, construction and cleaning. One example of where large amounts of sand slurry are used in hydraulic fracturing for increasing oil and gas production. In a hydraulic fracturing process, a fracturing fluid is injected through a wellbore into a subterranean formation at a pressure sufficient to initiate a fracture to increase oil and gas production. Frequently, particulates, called proppants, are suspended in the fracturing fluid and transported into the fracture as a slurry. Proppants include sand, ceramic particles, glass spheres, bauxite (aluminum oxide), and the like. Among them, sand is by far the most commonly used proppant. Fracturing fluids in common use include various aqueous and hydrocarbon gels. Liquid carbon dioxide and nitrogen gas are also used in fracturing treatments. The most commonly used fracturing fluids are aqueous fluids containing cross-linked polymers or linear polymers to effectively transport proppants into formation. At the last stage of a fracturing treatment, fracturing fluid is flowed back to surface and proppants are left in the created fracture to prevent it from closing back after pressure is released. The proppant-filled fracture provides a high conductive channel that allows oil and/or gas to seep through to the wellbore more efficiently. The conductivity of the proppant pack plays a dominant role in increasing oil and gas production. However it is well known that polymer residues from the fracturing fluid greatly reduce the conductivity of the proppant-pack.

The density of sand is about $2.6 \text{ g/cm}^3$ while the density of water is $1 \text{ g/cm}^3$. The large density difference between sand and water makes sand settle quickly in water, even under conditions of high water turbulence. Once settled, sand is not easily lifted by the flow of the aqueous liquid in which it has settled.

Conventionally, to make a relatively stable slurry under static or/and dynamic conditions, sand is commonly suspended in a viscoelastic fluid. In viscoelastic fluids, yield stress plays a dominant role in suspending the particles. Yield stress is the minimum shear stress required to initiate flow in a viscoelastic fluid. Basically, the viscosity of the fluid works to slow down the rate of particle settling, while the yield stress helps to suspend the particles. Under dynamic conditions, agitation or turbulence further help stabilize the slurry. Therefore, to make stable and cost-effective sand slurries, conventional methods focus on manipulating the theological properties of the fluid by adding a sufficient amount of viscosifier, for example, a natural or synthetic polymer, into the slurry. It is not unusual that a polymer is used together with a foaming agent to improve the rheology and to reduce the cost.

In some applications, for example, well cleanout and sand cleanout in pipe lines, where slurries have to be made in situ to carry the sand out, the presence of a viscosifier in the liquid medium normally has detrimental effect. This is mainly due to the fact that turbulent flow plays a critical role in transporting sand in these situations while a viscosifier tends to suppress the turbulence.

Flotation has been used in minerals engineering for the separation of finely ground valuable minerals from other minerals. Crude ore is ground to fine powder and mixed with water, collecting reagents and, optionally, frothing reagents. When air is blown through the mixture, hydrophobic mineral particles cling to the bubbles, which rise to form froth on the surface. The waste material (gangue) settles to the bottom. The froth is skimmed off, and the water and chemicals are removed, leaving a clean concentrate, The process, also called the froth-flotation process, is used for a number of minerals.

The primary mechanism in such a flotation process is the selective aggregation of micro-bubbles with hydrophobic particles under dynamic conditions to life the particles to the liquid surface. The minerals and their associated gangue usually do not have sufficient hydrophobicity to allow bubbles to attach. Collecting agents, known as collectors, are chemical agents that are able to selectively adsorb to desired minerals surfaces and make them hydrophobic to permit the aggregation of the particles and micro-bubbles and thus promote separation. Frothers are chemical agents added to the mixture to promote the generation of semi-stable froth. In the so-called reverse flotation process, the undesired minerals, such as silica sand are floated away from the valuable minerals which remain in the tailings. The reverse flotation of silica is widely used in processing iron as well as phosphate ores.

A wide variety of chemical agents are useful as collectors and frothers for flotation of silica particles. Amines such as simple primary and secondary amines, primary ether amine and ether diamines, tallow amines and tall oil fatty acid/amine condensates are known to be useful collectors for silica particles. It is well established that these chemical compounds strongly adsorb to sand surface and change the sand surface from hydrophilic to hydrophobic. In fact, the reason that these compounds are used as collectors is because of their capability of hydrophobising sand surface to allow form stable sand/bubbles aggregations. The preferred collectors are amine collectors having at least about twelve carbon atoms. These collectors are commercially available from, for example, Akzo Nobel or Tomah Products Inc. Other possible collectors are oleate salts which normally need presence of multivalent cations such as Ca++ or Mg++ to work effectively.

Compounds useful as frothers include low molecular weight alcohols including methyl isobutyl carbinol and glycol ethers.

Such flotation methods are not used in making sand slurries, and especially in making sand slurries for various oil field applications.

SUMMARY

According to one embodiment, the present invention relates to a slurry composition including a particulate, an aqueous medium and a collector which renders the surface of the particulate hydrophobic, and a method of making the same The present invention in another embodiment relates to a slurry composition including a particulate, an aqueous medium and a collector which renders the surface of the particulate hydrophobic, and a frother, and a method of making the same.

The present invention in a further embodiment relates to a slurry composition which can be made in situ, under dynamic conditions or "on-the fly".

In a still further embodiment, the present invention relates to a well service fluid composition comprising a particulate, an aqueous medium, and a collector which renders the surface of the particulate hydrophobic. The fluid can further include a frother. The fluid can further include a surfactant. The proppant can be sand.

DESCRIPTION OF THE INVENTION

In the present invention, attention is turned away from the rheology of the liquid medium containing the sand, and instead focused on the sand. While in each case the characteristics of sand (in this embodiment namely its size distribution and density) are constants, the present invention is directed to improving slurry fluidity and stability by "lifting" the sand instead of suspending the sand by the liquid medium.

In one embodiment, the lift is achieved by attaching micro-bubbles of sufficient stability to the sand surface. Alternatively, cavities are created among neighboring sand grains. The micro-bubbles or cavities attached to the sand surfaces help lift the sand up, due to the increased buoyancy.

In the present invention, the basic principle of reverse flotation is applied to the preparation of aqueous sand slurries for transporting sand, which have wide applications, especially in oil field. These applications include hydraulic fracturing, drilling, wellbore cleanout, sand cleanout in pipeline and sand jetting. Sand used in these applications typically range in size from 10 to abut 100 mesh. All these applications are carried out under dynamic conditions, where turbulence normally exists.

In the present invention, the surface of sand grains, which are strongly hydrophilic, are modified to become hydrophobic to allow aggregation with micro-bubbles in an aqueous liquid (including water, brines, and water containing small amounts of alcohols or other organic solvents) under dynamic conditions. The aggregation with bubbles provides sand with increased buoyancy and therefore greatly improves the fluidity and stability of the slurry, without employing a viscosifier.

There are different ways to make particulate slurries according to the present invention. For example, a particulate such as sand can be first treated with a collector in water, dried and then mixed with water under dynamic conditions to make slurry for later applications. Or the particulate slurry can be prepared "on-the-fly", i.e., sand, a collector, and water are mixed together, under dynamic conditions. Or the slurry can be prepared in situ, where sand is mixed with water containing a collector under dynamic conditions, for example, in wellbore cleanout and sand cleanout in pipeline, where liquid flow of high rate is normally applied.

In addition to the collectors, different furthers can also be added to enhance the fluidibility and the stability of the slurry. Frothers include methyl isobutyl carbinol, hexyl alcohol and glycol ethers. In addition to a collector, a conventional surfactant, which itself is not normally used as a collector, may also be added to enhance the flotation of the sand. However, any added surfactants must be compatible with the collector. For example, a surfactant should not form precipitation with a collector, and should not reduce the surface tension significantly to allow the hydrophobic sand be sufficiently wetted by the aqueous medium. Otherwise, micro-bubbles are not able to form stable aggregations with the hydrophobic sands.

Collectors useful in the present invention are amines including simple primary and secondary amines, primary ether amine and ether diamines, tallow amines and tallow oil fatty acid/amine condensates. Examples of such collectors include propanamine, 3-nonyloxy-; 1,3-propanediamine, N-tridecyloxy-3,1-propanediyl-; the condensate of diethylenetetraamine and tallow oil fatty acid, $C_{16}$-$C_{18}$ tallow amine, decylamine, dodecylamine, dihexyl amine, tetradecyloxypropyl amine, dodecyloxypropyl amine, octadecyl/hexadecyloxypropyl amine, isododecyloxypropyl amine, isotridecyloxypropyl amine, dodecyl-1,3-propanediamine, hexadecyl-1,3-propanediamine, tallow-1,3-propanediamine and the condensate of an excess of fatty acids with diethanolamine. Alkanol amines with short carbon chains, such as $C_{1-6}$ alkanol amines, or short carbon chain amine such as hexylamine can also be combined with long carbon chain amine collectors to enhance the flotation. Such collectors and related compositions for silica are well known in the art. More details can be found in U.S. Pat. Nos. 2,312,387; 2,322,201; 2,710,856; 4,234,414; and 5,124,028; S. Takeda and S. Usui in Colloid and Surfaces, 29, 221-232, 1988; and J. L. Scott and R. W. Smith in Minerals Engineering, Vol. 4. No, 2, 141-150, 1991. which are incorporated herein by reference.

Particulate slurries according to the present invention can be prepared at the surface or under a subterranean formation in situ where particulates, an aqueous fluid, and a collector, such as hexadecyl-1,3-propanediamine are mixed together. Additionally, a frother, for example, hexyl alcohol can also be added together with a collector into the slurry. Or the particulates can be first mixed with a fluid and a collector and then drying up the liquid. The treated particulates can be subsequently slurred.

The amount of collector needed generally depends on the sand concentration and size. Normally, the amount of a collector added is in the range of 0.01 g/kg to 1 g/kg sand. For example, during a fracturing operation, a collector can be added into water and mixed with sand as slurry under high pumping rate to transport sand into formation. In some cases, a friction reducing agent, for example, a small amount of a water soluble polymer, can also be added into the slurry to reduce friction pressure. It should be noted that the friction reducing agent should not form precipitation with the collector or reduce significantly the formation of bubble-sand aggragations. Optionally, nitrogen or carbon dioxide gas can be mixed into the slurry. Similarly in wellbore sand cleanout, water containing the collector is mixed with sand in situ at high flow rate and carries the sand out the wellbore efficiently. Optionally, nitrogen or carbon dioxide gas can be mixed with the fluid.

The following provides several non-limiting examples of the present invention.

EXAMPLE 1

100 ml of water and 50 grams of 30/50 US mesh fracturing sands were added into each of two glass bottles (200 ml). 0.07 ml of Armeen DMTD, a tallowalkyl-dimethyl amine from Akzo Nobel, was added into one of the bottles and the other bottle was used as control. The bottles were vigorously shaken and then let stand to allow sands settle down. While there are no bubbles observed in the control one, bubbles are attached to the sand grains in the one containing Armeen DMTD, and moreover there were a layer of sands floating on the top. The volumes of the settled sands in the two bottles were compared. In the bottle containing Armeen DMTD, the volume of the settled sands was about 20 percent greater than the one without, and the sands are more fluid. Bubbles are attached to the sand grains. When the bottles were tilted slowly, the settled sands in the control tended to move as individual sand grains, while the settled sands containing Armeen DMTD tended to move as cohesive masses.

EXAMPLE 2

100 ml of water and 50 grams of 30/50 US mesh fracturing sands were added into each of two glass bottles (200 ml). 0.07 ml of Armeen DMTD, a tallowalkyl-dimethyl amine from Akzo Nobel, and 0.05 ml of TEGO Betaine 810, capryl/capramidopropyl betaine, an amphoteric hydrocarbon surfactant from Degussa Corp., were added into one of the bottles and the other bottle was used as control. The bottles were vigorously shaken and then let stand to allow sands settle down. While there are no bubbles observed in the control one, bubbles are attached to the sand grains in the one containing Armeen DMTD, and moreover there were a layer of sands floating on the top. The volumes of the settled sands in the two bottles were compared. In the bottle containing Armeen DMTD, the volume of the settled sands was about 20 percent greater than the one without, and the sands are more fluid. Bubbles are attached to the sand grains. When the bottles were tilted slowly, the settled sands in the control tended to move as individual sand grains, while the settled sands containing Armeen DMTD tended to move as cohesive masses.

EXAMPLE 3

100 ml of water and 50 grams of 30/50 US mesh fracturing sands were added into each of two glass bottles (200 ml). 0.05 ml of Armeen DMTD, a tallowalkyl-dimethyl amine from Akzo Nobel, and 0.3 ml of hexyl alcohol were added into one of the bottles and the other bottle was used as control. The bottles were vigorously shaken and then let stand to allow sands settle down. While there are no bubbles observed in the control one, bubbles are attached to the sand grains in the one containing Armeen DMTD, and moreover there were a layer of sands floating on the top. The volumes of the settled sands in the two bottles were compared. In the bottle containing Armeen DMTD, the volume of the settled sands was about 50 percent greater than the one without, and the sands are more fluid. When the bottles were tilted slowly, the settled sands in the control tended to move as individual sand grains, while the settled sands containing Armeen DMTD tended to move as cohesive masses.

I claim:

1. A method of preparing a fracturing slurry composition for a fracturing operation comprising mixing together:
   a. sand proppants,
   b. water,
   c. a collector which renders the surface of the proppants hydrophobic, and
   d. a gas,
   wherein the collector is selected from a group consisting of a primary amine, a secondary amine, a tertiary amine, a primary ether amine, an ether diamines, a tallow amine, and a tallow oil fatty acid/amine condensate; and
   wherein bubbles are attached to the sand surfaces under dynamic conditions.

2. The method according to claim 1 wherein the collector is a primary amine containing at least twelve carbon atoms.

3. The method according to claim 1 wherein the collector is a secondary amine containing at least twelve carbon atoms.

4. The method according to claim 1 wherein the collector is selected from a group consisting of propanamine, 3-nonyloxy-; 1,3-propanediamine, N-tridecyloxy-3,1-propanediyl-; the condensate of diethylenetetraamine and tallow oil fatty acid, tallow amine, tallowalkyl-dimethyl amine, decylamine, dodecylamine, dihexyl amine, tetradecyloxypropyl amine, dodecyloxypropyl amine, octadecyl amine, hexadecyloxypropyl amine, isododecyloxypropyl amine, isotridecyloxypropyl amine, hexadecylamine, dodecyl- 1,3-propanediamine, hexadecyl-1,3-propanediamine, tallow-1,3-propanediamine, the condensate of an excess of fatty acid with diethanolamine and an oleate salt.

5. The method according to claim 1 further comprising a frother.

6. The method according to claim 5 wherein the frother is an alcohol.

7. The method according to claim 5 wherein the frother is selected from a group consisting of a hexyl alcohol, a methyl isobutyl carbinol, a glycol ether and a combination thereof.

8. The method according to claim 1 wherein the gas is selected from a group consisting of air, nitrogen and carbon dioxide.

9. The method according to claim 1 wherein the collector is at a concentration in the range of about 0.1 g/kg to 1 g/kg of proppant.

10. The method according to claim 1 further comprising a friction reducing agent.

11. The method according to claim 1 wherein the collector is a tallow amine.

12. The method according to claim 1 wherein the collector is an octadecyl amine.

13. The method according to claim 1 wherein the collector is a tallowalkyl-dimethyl amine.

14. The method according to claim 1 wherein the fluid composition is prepared in an underground formation.

15. A method of making an aqueous fracturing slurry composition for hydraulic fracturing operation comprising:
   a. contacting sand proppant with a medium containing a collector to render the proppant hydrophobic;
   b. separating the proppant from the medium,
   c. mixing the treated proppants under dynamic conditions, with water under shear in the presence of a gas; and
   wherein the collector is selected from a group consisting of a primary amine, a secondary amine, a tertiary amine, a primary ether amine, an ether diamines, a tallow amine, and a tallow oil fatty acid/amine condensate; and
   wherein bubbles are attached to the sand surfaces under dynamic conditions.

16. The method of claim 15 wherein the collector is a primary amine containing at least twelve carbon atoms.

17. The method of claim 15 wherein the collector is a secondary amine containing at least twelve carbon atoms.

18. The method of claim 15 wherein the collector is selected from a group consisting of propanamine, 3-nonyloxy-; 1,3-propanediamine, N-tridecyloxy-3,1-propanediyl-; the condensate of diethylenetetraamine and tallow oil fatty acid, tallow amine, tallowalkyl-dimethyl amine, decylamine, dodecylamine, dihexyl amine, tetradecyloxypropyl amine, dodecyloxypropyl amine, octadecyl amine, hexadecyloxypropyl amine, isododecyloxypropyl amine, isotridecyloxypropyl amine, hexadecylamine, dodecyl-1,3-propanediamine, hexadecyl-1,3-propanediamine, tallow-1,3-propanediamine, the condensate of an excess of fatty acid with diethanolamine and an oleate salt.

19. The method of claim 15 wherein the collector is a tallow amine.

20. The method of claim 15 wherein the collector is an octadecyl amine.

21. The method of claim 15 wherein the collector is a tallowalkyl-dimethyl amine, 22. The method of claim 15 wherein the gas is selected from a group consisting of air, nitrogen and carbon dioxide.

23. The method of claim 15 wherein the composition further comprising a friction reducing agent.

24. The method according to claim 1 wherein the collector is a primary amine containing at least eighteen carbon atoms.

25. The method according to claim 1 wherein the collector is a secondary amine containing at least eighteen carbon atoms.

26. The method according to claim 1 wherein the collector is a tertiary amine containing at least eighteen carbon atoms.

27. The method according to claim 15 wherein the collector is a primary amine containing at least eighteen carbon atoms.

28. The method according to claim 15 wherein the collector is a secondary amine containing at least eighteen carbon atoms.

29. The method according to claim 15 wherein the collector is a tertiary amine containing at least eighteen carbon atoms.

* * * * *